United States Patent [19]

Agnew

[11] Patent Number: 4,623,059
[45] Date of Patent: Nov. 18, 1986

[54] CONVEYOR SINGLE FILING SYSTEM

[76] Inventor: Vincent R. Agnew, 816 El Vecino Ave., Modesto, Calif. 95350

[21] Appl. No.: 738,511

[22] Filed: May 28, 1985

Related U.S. Application Data

[63] Continuation of Ser. No. 503,869, Jun. 13, 1983, abandoned.

[51] Int. Cl.⁴ .............................................. B65G 47/26
[52] U.S. Cl. .................................... 198/452; 198/453
[58] Field of Search ................ 198/448, 452, 453, 454

[56]  References Cited

U.S. PATENT DOCUMENTS

| | | | |
|---|---|---|---|
| 3,279,580 | 10/1966 | Englander et al. | 198/452 |
| 3,310,151 | 3/1967 | Carter | 198/453 X |
| 3,610,396 | 10/1971 | Babunovic | 198/454 |
| 3,710,919 | 1/1973 | Maters | 198/453 |
| 4,142,636 | 3/1979 | Planke | 198/452 X |

FOREIGN PATENT DOCUMENTS

| | | | |
|---|---|---|---|
| 2040471 | 2/1972 | Fed. Rep. of Germany | 198/452 |
| 2505333 | 8/1975 | Fed. Rep. of Germany | 198/453 |

Primary Examiner—Robert J. Spar
Assistant Examiner—Jonathan D. Holmes
Attorney, Agent, or Firm—Cushman, Darby & Cushman

[57]  ABSTRACT

An orienting and combining device for use with conveyor systems where it is desirable to reduce a random orientation of a plurality of articles into a single file row for further conveying in that form. The device can be attached to existing conveying systems and is comprised of an outer frame structure which positions a plurality of triangular shaped blocks on each side of a conveyor belt. The blocks are offset from one another on opposite sides of the conveyor belt and together define a particular zig-zag course through which the article must pass. The dimensions of the blocks are dependent upon the diameter of the articles being conveyed and will orient the article efficiently and quickly virtually without jamming into a configuration that will easily permit the formation of the single file row.

13 Claims, 6 Drawing Figures

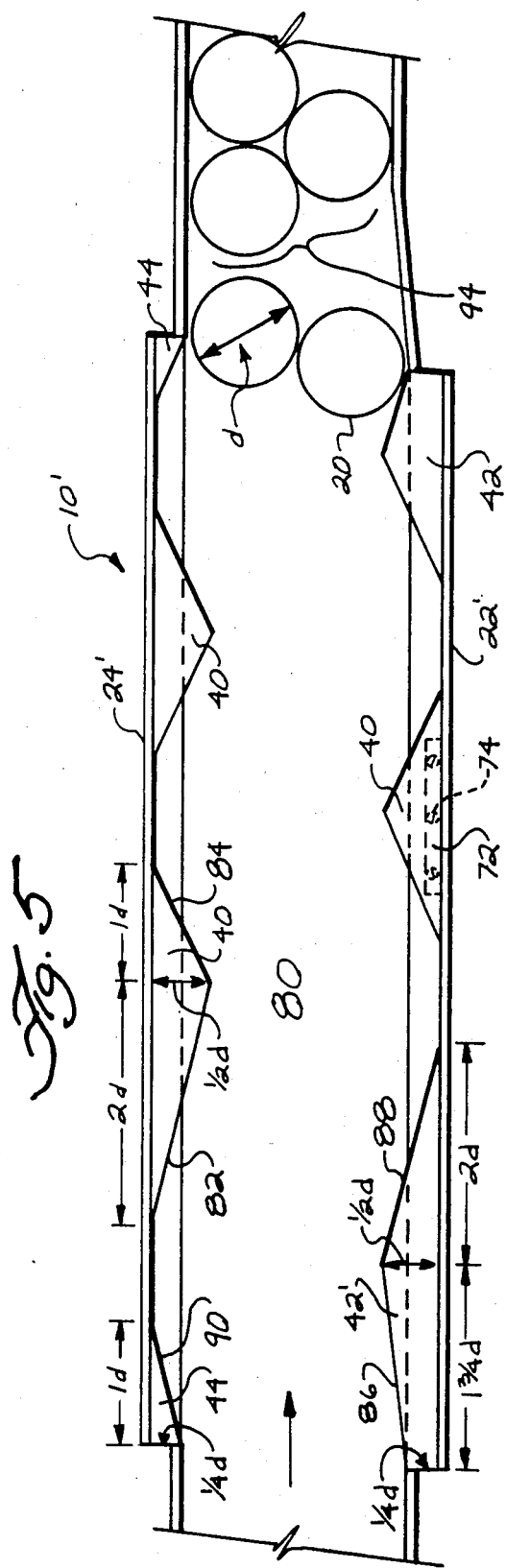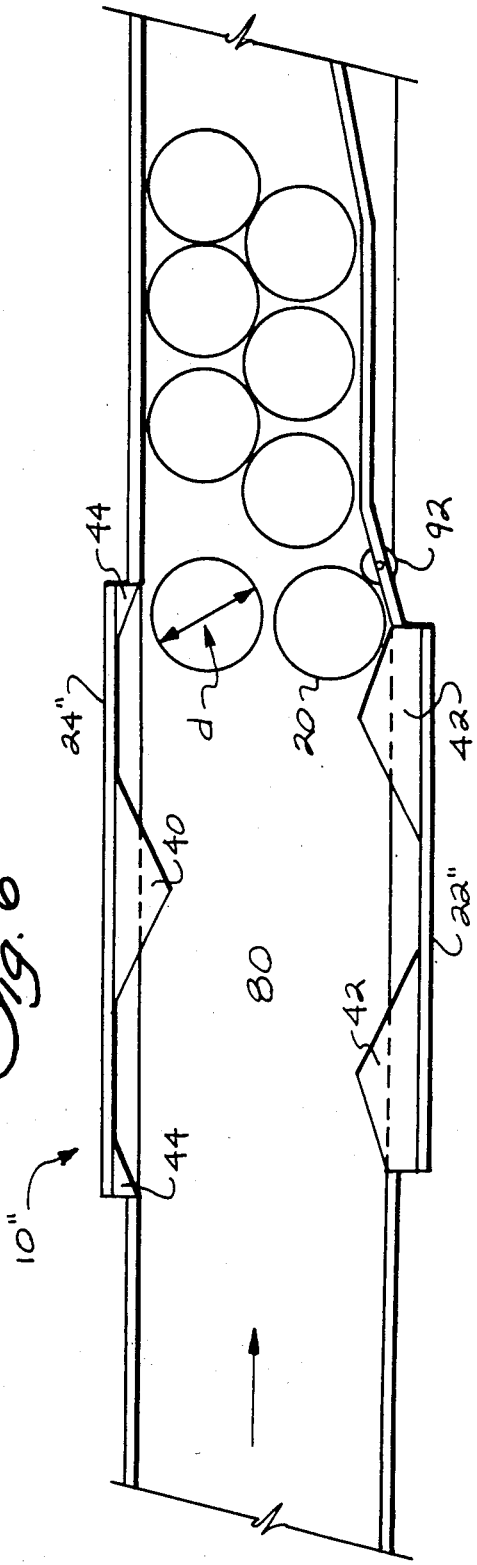

CONVEYOR SINGLE FILING SYSTEM

This is a continuation of application Ser. No. 503,869, filed June 13, 1983, now abandoned.

FIELD OF THE INVENTION

This invention relates to a device for use with a conveyor for organizing and arranging articles to allow them to be formed into a single file flow.

BACKGROUND OF THE PRESENT INVENTION

For many years it has been a desire in the packaging industry while packing or handling articles such as cans, bottles or any other type of cylindrical containers or those that have a substantially circular cross section, to automatically arrange discrete articles into a tandem or single row formation, such as a rectilinear formation. More specifically, it is desirable to have a conveying means for discrete articles that will move those articles uninterruptedly in a group and to rearrange that group into a single row formation without any stops occuring and to have those discrete articles continuously move in an orderly and definite manner.

In the past, this has involved the use of a combining area where one or more sidewalls would be angled inwardly toward the path of travel so as to move the articles transversely as they are advanced. As the width of the conveyor system converged toward the discharge end it was the desire that one article at a time would pass out of the discharge end.

A major problem in effecting this combining or converging process was that jams of the conveyed articles would occur. Of course, until such jams could be effectively removed, manually or otherwise, effective conveying of the articles would be terminated.

A number of proposals for solving these jamming or stoppage problems have been proposed including the placement or arranging of the center points or axes of the converging articles so that they are at the corners of an equilaterial triangle. Reference in this regard can be made to Carter U.S. Pat. No. 3,310,151 and German Offenlegungsschrift No. 2,505,333.

In Babunovic, U.S. Pat. No. 3,610,396 and the above Offenlegungsschrift also relate to container combiners which progressively move containers transversly until they form into a single row with the single row exit conveyor being substantially transversely offset from the initial infeed conveyor.

In a similar manner, Englander et al U.S. Pat. No. 3,279,580 also moves containers transversely across a conveyor in order to combine the containers together into a single file. The transverse movement, however, is relatively slow and not conducive to high speed conveyor transportation.

It has also been suggested that various zig-zag arrangements be employed as in Carter U.S. Pat. No. 3,310,151 and Maters U.S. Pat. No. 3,710,919.

In Carter a plurality of endless conveyor belts placed on various sides of one another are used to convey articles through a zig-zag course defined between two sidewalls which have a dissimilar shape.

In Maters a relatively wide conveyor belt is used and containers which are supplied in a random fashion are first directed at a relatively large inward projection which forces the containers toward a flat opposite wall. That projection has a height or extends into the path of the articles a distance approximately equal to three times the diameter of those articles. Thereafter, the path continues to narrow notwithstanding the zig-zag course with the next projection extending more than halfway across the width of the conveyor belt and into the flow of the articles from the opposite side with a width of that projection being approximately equal to four times the diameter of the articles. This moves the article back toward the side containing the first projection. The articles then flow transversely back across the conveyor in a double row configuration and finally pass into a confined wall area where their flow is arranged in a single file fashion. In this latter form, the single row occupies a position on one side of the conveyor leaving the remaining portions of the conveyor virtually unused.

SUMMARY OF THE PREFERRED EMBODIMENTS OF THE PRESENT INVENTION

The present invention relates to an improved conveyor system and in particular to an article combining device for use with relatively narrow conveyor belts that allows substantially in line reorganizing of containers or articles being conveyed. The device can be added to a conveyor line and permits their reorganization while still allowing them to be moved at a relatively rapid rate and in a simple manner that virtually assures their not jamming during the combining operation.

The invention is comprised of a device comprised of an outer frame and a plurality of orienting block members that overlay a conveyor and project inwardly from each side to define a particular zig-zag course therebetween. The device, and the outer support frame can be placed just upstream from a tapering section of sidewalls in which the containers will be forced into a single file relationship.

The articles are preferably allowed to enter the device through an opening that is slightly wider than a diameter of two of the articles. Thereafter, the articles pass a series of substantially triangular shaped blocks the bases of which are fixed to sidewalls of the combiner or organizer so that their angled surfaces and outer peaks face inwardly toward the articles. The device includes at least an inlet and outlet pair of blocks and at least one intermediate block positioned therebetween with each of the blocks on each side of the device being separated a distance equal to the diameter of one of the articles being handled.

The intermediate blocks that are used have a base equal to twice the diameter (d) of the articles being handled and a width equal to one-half of that diameter.

Each pair of inlet and outlet blocks include one block which is a right triangle where the face surface defined by the width is equal to one-quarter of the diameter of the articles. The other triangular shaped block also includes a vertical wall or face perpendicular to its base surface with a width similarly equal to one-quarter of the diameter of the articles being handled while the base is one and three-quarters long with a width to the peak being one-half the diameter. Each of these one-quarter surfaces face the inlet or outlet, respectively, and in each instance, the base of each of the triangular shapes is fixed to a sidewall forming the exterior sides of the combining or organizing section of the conveyor.

Preferably this orienting or combining section can be added to an existing conveyor structure by being suitably bolted or otherwise conventionally fixed in place adjacent each side of the conveyor so that the orienting blocks overlay the conveyor and project inwardly from each side the desired distance.

As a minimum, it is preferred that the orienting section include an entrance and exit pair of blocks as well as at least one intermediary block. However, it is possible to include additional intermediary blocks, preferably an odd number since each will be offset from one another with the spacing between each being equal to the diameter of one of the items or articles being moved on the conveyor. In an additional embodiment, the blocks adjacent the input end can be streamlined by having their weight reduced and their length increased. This makes it possible to move the items on the conveyor at a relatively fast rate, comparable to feeding a thousand articles or more per minute.

The orienting device disclosed herein allows the cans, bottles or other containers or articles being moved by the conveyor to continue to move at a relatively rapid rate without jamming and will be discharged from the orienting device in a manner such that they are nested together in the desired staggered fashion after which they can naturally converge into a single line still without jamming as they move continuously along a gradually narrowing conveyor path.

These and other objects and advantages of the invention will become more apparent and more readily appreciated from the following detailed description of the presently referenced exemplary embodiments of the invention taken in conjunction with the accompanying drawings all of which form the specification.

BRIEF DESCRIPTION OF THE DRAWINGS

FIG. 5 shows a diagramatic top plan view of a modified embodiment of the present invention which has been streamlined for faster conveyor speeds; and FIG. 6 is a diagramatic top plan view of the orienting combining devices of the present invention showing the minimum path for such an organizing device.

DETAILED DESCRIPTION OF THE PREFERRED EMBODIMENTS OF THE PRESENT INVENTION

Figure 1:
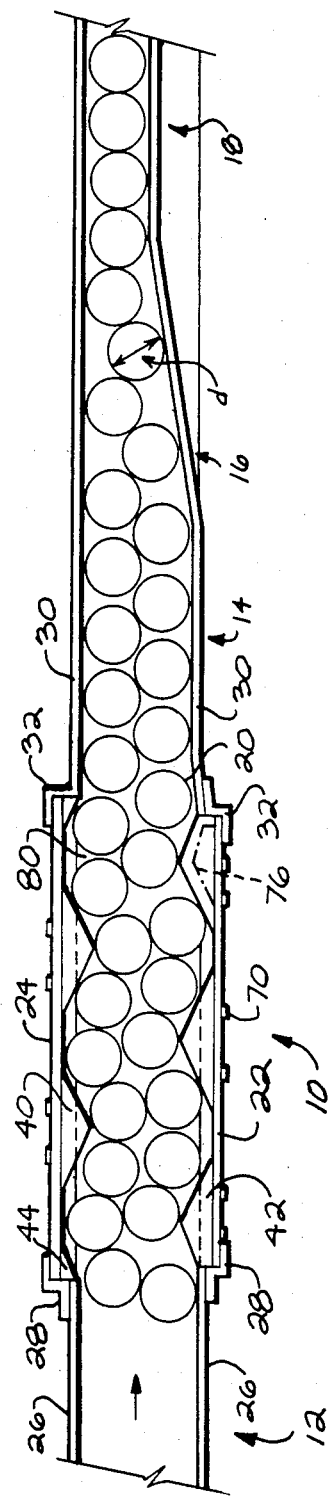
FIG. 1 is a diagramatic top plan view of a conveyor system including the combining and orienting device as disclosed and described herein.

Turning first to FIGS. 1–4, FIG. 1 shows the invention generally indicated at 10 within a portion of a conveyor system generally comprised of an inlet section 12, an outlet section 14, a gradually narrowing or tapering section 16, and a single file section 18. Each of the articles 20 being conveyed has a circular cross-section with a diameter d. Articles 20 can comprise any type of cylindrically shaped article or any item that has a circular or substantially circular cross section. This can include can, bottles of various materials including glass and plastic, or larger items such as pails or even kegs of beer.

The orienting or combining device 10 is comprised of two outer frames 22 and 24 which extend parallel to the conveyor and define opposite sides of the device. Frames 22 and 24 can be either solid sheets of metal or a network of interconnecting webs or frame members suitably connected together. This outer frame structure is likewise suitably fixed or secured in place on the conveyor structure by suitable brackets (not shown) or angle irons to the bottom or sides of the conveyor structure itself. Frame members 22 and 24 could be solid metal plates that could be joined to the sidewalls 26 of the inlet section such as by brackets 28 and at their opposite ends similarly to the sidewalls 30 of the outlet section as for example by brackets 32. The exact means of attaching device 10 to the conveyor system, however, is not critical so long as it is fixed securely in place on opposite sides of the conveyor with the orienting blocks correctly positioned over the conveyor.

Figure 3:
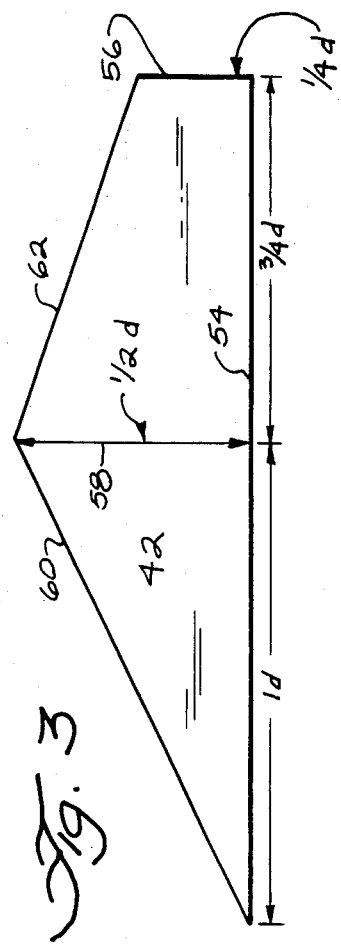
FIGS. 3 and 4 represent the two blocks used in each pair of blocks adjacent the inlet and outlet.
Figure 4:
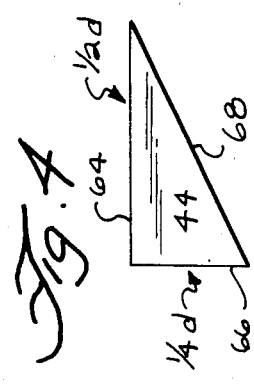
Figure 2:
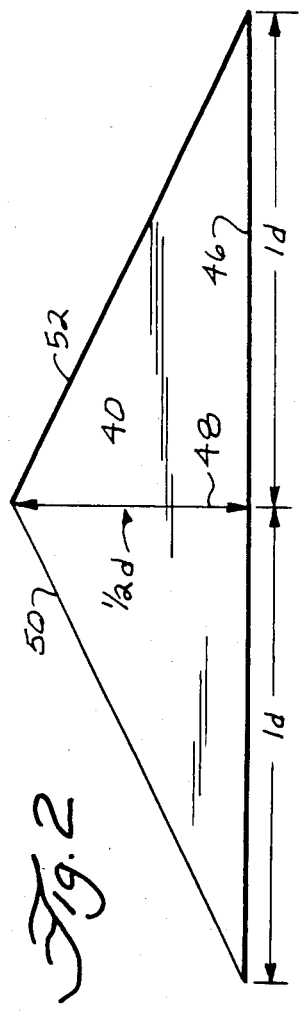
FIG. 2 is a diagramatic top plan view of an intermediate block.

Turning now to FIGS. 2–4 three types of triangular shaped orienting blocks are shown. The intermediate block is shown in FIG. 2 at 40, while block 42, shown in FIG. 3, comprises one of the blocks used in the inlet and outlet pairs and block 44, shown in FIG. 4, comprising the other block used in the inlet and outlet pairs. The dimensions of the blocks depend upon the diameter d of each of the articles being transported or moved by the conveyor system. For example, intermediate blocks 40 have a base surface 46 that is two d in length and a width indicated by the arrow at 48 that is one-half d. The two angled surfaces 50 and 52 will be contacted by the articles when the block is mounted as shown at FIG. 1. It should be noted, that with respect to the intermediate blocks 40, the peaks thereof are offset from one another across the width of the conveyor with the peaks of each block on one side being directed at the gap between blocks on the opposite side with that gap length being one d.

Turning next to FIG. 3, the base surface of this block is indicated at 54 and has a length of approximately one and three-quarter d. The front surface 56 has a width of one quarter d and when mounted this surface will be directed toward the inlet or outlet as shown in FIG. 1. The width of the triangular section, indicated by arrow 58 is also one-half d and again the surfaces 60 and 62 will be the surfaces contacted by the articles as they are moved past this block.

FIG. 4 shows the other block that is used within the pair lying adjacent the inlet and exit of the organizing device 10. The base of block 44 is indicated at 64 and has a length of approximately one-half d while the width of that triangular section is also defined by the front face 66, that width being one-quarter d which is the same as surface 56 on block 42. The exterior surface 68 is the surface along which the articles will move during ingress and egress.

Each of the blocks 40, 42 and 44 can be secured to device 10 in a variety of ways. If the blocks 40-44 have a thickness equal to the vertical height of sidewalls 22 and 24 or to the articles 20 being moved they can be bolted as for example by bolts 70 indicated in FIG. 1 so that their base surfaces 46, 54 and 64 are each secured against the interior side of plates or walls 22 and 24. Alternatively, if the blocks 40-44 are narrow members, two or more could be used with one being positioned to interset the base of the articles 20 while a second could be placed adjacent the upper portion of plates 22 and 24. In this construction, a vertical mounting plate such as shown in phantom at 72 in FIG. 5 could be mounted to the sidewall plates 22 and 24 and the blocks for example 40 could be mounted to the top and bottom edges mounting plate 72 as for example by screws indicated at phantom at 74.

It should be understood that blocks 40, 42 and 44 can be constructed from a variety of materials it being necessary that articles 20 can slide thereagainst and that the blocks be relatively rigid and long wearing. Examples of the types of materials that can be used include plastics, for example polypropylene or polyethylene, or other resin and/or polymer combinations, metals such as aluminum or steel or for that matter natural materials including wood or various other types of man made products. What is essential, is that the blocks be proportioned as indicated above and that they be positioned along the wall members 22 and 24 as shown.

With respect to the size and positioning of the blocks, it has been determined that the block 42 adjacent the output end of device 10 could have a smaller size although the shape should be proportionally the same. Such a reduced size block is indicated in phantom at 76 in FIG. 1. In addition, the width of the device at its entrance and exit is approximately the width of two of the articles, two d, plus one-quarter of an inch.

With reference again to FIG. 1, the conveyor belt is indicated at 80 and has a width less than the distance between plates 22 and 24 as the articles can remain adequately supported notwithstanding that some portion of their bottom surface may extend outwardly beyond the outer boundary of belt 80.

Turning now to FIG. 5, an alternative construction for higher speed use is shown wherein the conveyor can move 1,000 cans or bottles or more per hout. The device is generally indicated at 10' and again is comprised of sidewalls or plates 22', 24' to which the base surfaces of the blocks are mounted as discussed previously. As indicated in FIG. 5, the pair of exit blocks 42 and 44 have the same shape and dimensions as those discussed previously with respect to FIG. 1. In addition, the last two intermediate blocks 40 are likewise similarly shaped. However, the inlet blocks which have been designated 42' and 44' as well as the first intermediate block 40' have had their shapes altered so that the contacting surfaces have been elongated and streamlined. For example, the exterior surfaces 82 and 84 on block 44' have now been elongated as the base of block 40' has been lenghtened to three d while maintaining a half d width. Similarly, the exterior surfaces 86 and 88 of block 42' have likewise been elongated as the total base surface has been lengthened to three and three-quarters d while again maintaining the width at one-half d. In addition, the exterior surface 90 on block 44' has also been extended as the base surface has been lengthened to one d while maintaining the width at one-quarer d. By elongating blocks 40', 42' and 44' cans will be able to move more rapidly into the orienting or combining device without having their sidewalls dented, which could be a problem if thin walled aluminum cans were being carried by conveyor 80. It should be pointed out, that in each instance in FIGS. 1, 5 and 6 conveyor 80 is moving in the direction of the arrow as shown thereon. As was true in the structure shown in FIG. 1, the inlet and outlet dimensions for the device 10' is also slightly wider than two d with the spacing between blocks remaining at a one d length.

Turning now to FIG. 6, the device is generally indicated at 10" with sidewalls 22" and 24" again comprising the primary mounting structure with those walls again being mounted to the conveyor system in any secure and convenient manner. Blocks 40, 42 and 44 remain of a size as set forth in FIG. 1, but this structure shown in FIG. 6 constitutes the minimum length required for orienting and preparing the articles 20 for being combined together into a single file fashion. In this combination of blocks, the inlet and outlet pairs of blocks 42 and 44 are employed together with a single intermediate block 40 secured to wall 24" which also serves as the wall for mounting blocks 44 at the entrance and exit ends. The distances between blocks again remains at the one d length.

Also included on the FIG. 6 structure is a skate wheel 92 that will prevent two cans from locking up at the exit end of the device. Wheel 92 is mounted to freely rotate and serves to stop an article 20 that lies directly adjacent to it thereby allowing the article lying on the opposite or outer side to move around the one that is stopped and pass on ahead. Subsequent articles will then push the stopped article 20 past wheel 92 and the next two articles will then be presented into the position as is shown by the last two articles in FIG. 6.

Thus, FIG. 6 discloses the minimum length for the device in order to provide a sufficient zigzag arrangement to produce the desirable article configuration in the outlet section of the conveyor 14, with that arrangement being shown by bracket 94 in FIG. 5.

While, the invention has been described in connection with what are presently considered to be the most practical and preferred embodiments, it is to be understood that the invention is not to be limited to the disclosed embodiments but on the contrary, is intended to cover various modifications and equivalent arrangements included within the spirit and scope of the appended claims, which scope is to be accorded the broadest interpretation so as to encompass all such modifications and equivalent structures.

What I claim is:

1. An article combining device for orienting conveyed articles having a diameter d so that they can be formed into a single file flow comprising:
    a conveyor system including a conveyor belt,
    frame means supporting the device and for forming the opposing sides of said device, said frame means being secured so as to extend parallel to said conveyor belt,
    and block means, secured to said frame means and positioned above said conveyor belt, for defining a zig-zag orienting passageway along a portion of said conveyor system through which said articles will move, said block means including a pair of inlet block members, a pair of outlet block members, and at least one intermediate block member positioned therebetween, said block means being of a triangular shape and, arranged on each side of said conveyor belt with the block members positioned on each side being spaced apart a distance d equal to the diameter of the articles being handled so that as said articles move through the zig-zag orienting passageway, each will be oriented into a flow pattern that will permit subsequent orientation into a single file formation.

2. An article combining device as in claim 1, wherein each of said inlet and outlet pairs include one block member in the shape of a right triangle.

3. An article combining device as in claim 2, wherein each article has a diameter d and the width of said right triangle block member is equal to one quarter d.

4. An article combining device as in claim 2, wherein each of said right triangle block members is secured to the same side of said device.

5. An article combining device as in claim 4, wherein said intermediate block member is positioned on the same side as said right triangle block members and is spaced a distance equal to one d from each.

6. An article combining device as in claim 2, wherein the other block member in each of said inlet and outlet pairs is comprised of a substantially triangular block member having a base, two angled surfaces defining the width thereof and one side face extending normally from one end of said base so that it intersects with one of said two angled surfaces.

7. An article combining device as in claim 6, wherein said one side face has a length of one quarter d.

8. An article combining device as in claim 1, wherein said block means includes a plurality of said intermediate block members.

9. An article combining device as in claim 1, wherein said intermediate and said other block members each have a width equal to one half d.

10. An article combining device as in claim 9, wherein said right angle block members have a base equal in length to one half d, said other block members have a base equal in length to one and three quarters d, and said at least one intermediate block member has a base equal in length to two d.

11. An article combining device as in claim 9, wherein a predetermined number of said individual block members adjacent the inlet of said device are elongated.

12. An article combining device as in claim 1, wherein said block means are comprised of plastic.

13. A device for use with a conveyor system for arranging cylindrically shaped articles having a diameter d into a condition where each can be moved into a single-file condition, said device comprising a conveyor line including a moving conveyor, said conveyor line including a first conveyor section for handling a plurality of said articles across the width thereof and a second conveyor section for handling said articles in a single file fashion, and an orienting section positioned between said first and second conveyor sections, said orienting section including a pair of exterior support members extending along the length of said section parallel to the direction of travel on the conveyor line and defining the sides thereof, a predetermined number of orienting blocks including at least an inlet pair, an exit pair and one intermediate block, the bases thereof being fixed to said support members, each of said blocks having a triangular shape with a width not greater than one half d with each block being spaced apart along each side of the conveyor line by a distance equal to one d.

* * * * *